(12) United States Patent
Tan et al.

(10) Patent No.: US 8,120,890 B2
(45) Date of Patent: Feb. 21, 2012

(54) HIGH TEMPERATURE FILM CAPACITOR

(75) Inventors: Daniel Qi Tan, Rexford, NY (US); Patricia Chapman Irwin, Altamont, NY (US); Yang Cao, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 834 days.

(21) Appl. No.: 12/179,897

(22) Filed: Jul. 25, 2008

(65) Prior Publication Data
US 2010/0020468 A1    Jan. 28, 2010

(51) Int. Cl.
*H01G 4/06* (2006.01)
(52) U.S. Cl. ..... 361/313; 361/312; 361/303; 361/321.1; 361/321.4
(58) Field of Classification Search .......... 361/313, 361/303–305, 311, 312, 321.1, 321.2, 306.1
See application file for complete search history.

(56) References Cited

U.S. PATENT DOCUMENTS

| 5,490,035 | A | * | 2/1996 | Yen et al. ............... 361/311 |
| 5,563,765 | A | * | 10/1996 | Lian et al. ............... 361/503 |
| 5,638,251 | A | | 6/1997 | Goel et al. |
| 6,426,863 | B1 | * | 7/2002 | Munshi ............... 361/503 |
| 6,594,134 | B2 | * | 7/2003 | Yializis ............... 361/305 |
| 6,762,237 | B2 | | 7/2004 | Glatkowski et al. |
| 7,542,265 | B2 | * | 6/2009 | Tan et al. ............... 361/321.1 |
| 7,852,611 | B2 | * | 12/2010 | Tan ............... 361/313 |
| 2008/0123250 | A1 | | 5/2008 | Tan et al. |

FOREIGN PATENT DOCUMENTS

EP    1155818    7/2007

OTHER PUBLICATIONS

EP Search Report, EP09165604, Nov. 13, 2009.

* cited by examiner

*Primary Examiner* — Nguyen T Ha
(74) *Attorney, Agent, or Firm* — Ann M. Agosti

(57) ABSTRACT

A capacitor comprises a substrate layer, a first electrode layer disposed on the substrate layer, and a first dielectric layer disposed on the electrode layer. The dielectric layer comprises a polymeric material having an elongation less than or equal to about 5 percent.

24 Claims, 3 Drawing Sheets

HIGH TEMPERATURE FILM CAPACITOR

FIELD OF THE INVENTION

The invention includes embodiments that relate to a capacitor. More particularly, the invention includes embodiments that relate to a film capacitor.

BACKGROUND OF THE INVENTION

Film capacitors are typically constructed by co-winding displaced, metallized polymer films. The polymer films must be sufficiently ductile to ensure proper winding of the films, and the use of weak or brittle film material is not possible. Accordingly, in the electronics industry, as well as in the automotive industry, aviation industry, oil and gas well exploration, there is a need for capacitors which may comprise weak or brittle polymers, yet still exhibit a high dielectric constant, high breakdown strength, as well as good mechanical strength.

BRIEF SUMMARY OF THE INVENTION

In one embodiment, a capacitor comprises a substrate layer, a first electrode layer disposed on the substrate layer, and a first dielectric layer disposed on the electrode layer. The dielectric layer comprises a polymeric material having an elongation less than or equal to about 5 percent.

In another embodiment, a capacitor comprises a substrate layer comprising cellulose triacetate, wherein the substrate layer has a tensile strength of greater than or equal to about 300 psi. A first electrode layer is disposed on the substrate layer, and a first dielectric layer is disposed on the electrode layer. The dielectric layer comprises a polymeric material having an elongation less than or equal to about 5 percent.

DETAILED DESCRIPTION OF THE INVENTION

Disclosed herein are film capacitors with improved dielectric and mechanical properties. Some of the dielectric properties considered herein are dielectric constant, breakdown voltage, and loss factor. The "dielectric constant" of a dielectric is a ratio of capacitance of a capacitor in which the space between and around the electrodes is filled with the dielectric, to the capacitance of the same configuration of electrodes in a vacuum. As used herein, "dielectric breakdown voltage" refers to a measure of the dielectric breakdown resistance of a material under an applied AC or DC voltage. The applied voltage just before breakdown is divided by thickness of the dielectric to give the breakdown voltage. It is measured in kV/mm. In an ideal dielectric, the voltage wave and the current wave are 90 degrees out of phase. In a real dielectric as the dielectric becomes less than 100% efficient, the current wave begins to lag the voltage in direct proportion. This results in a proportional power loss in the dielectric. The extent to which the current wave deviates from being 90 degrees out of phase with the voltage is defined as the dielectric loss angle. The tangent of this loss angle is known as the loss factor or dissipation factor.

Figure 1:
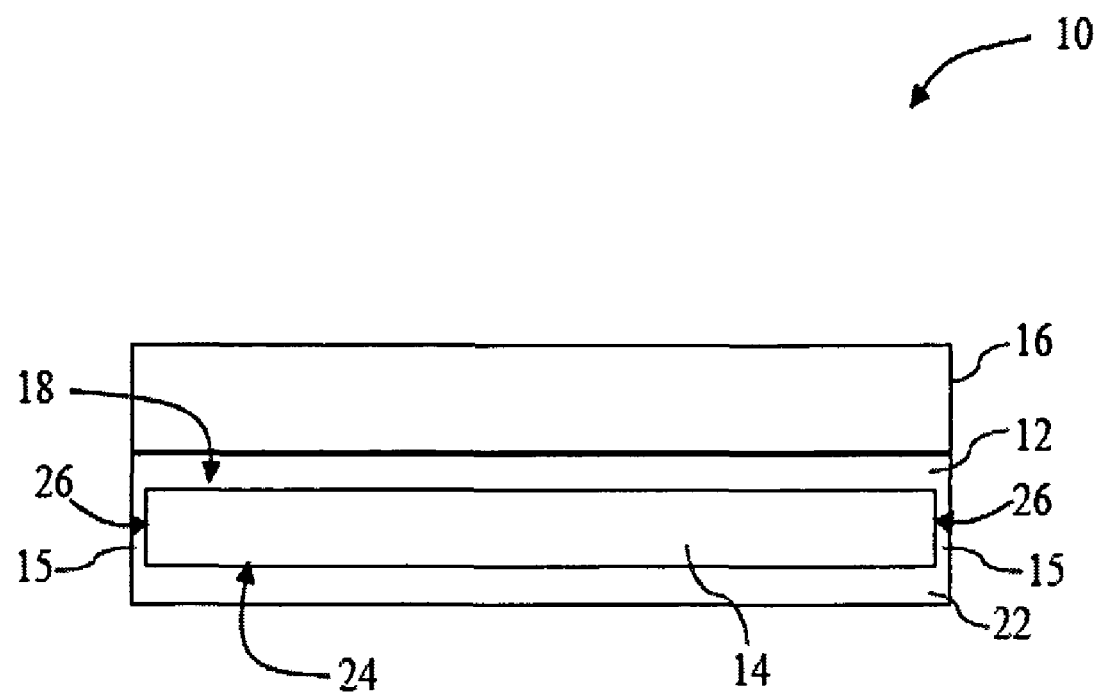
FIG. 1 is a cross-sectional view of a film capacitor in accordance with an embodiment of the invention.

Referring to FIG. 1, shown is a film capacitor 10 comprising a first electrode layer 12 disposed on and supported by a substrate layer 14. In one embodiment, the substrate layer 14 is a polymer film, and the first electrode layer 12 disposed on the substrate layer forms a metallized polymer film. The metallized polymer film comprised of the substrate layer 14 and first electrode layer 12, is used as a substrate to provide sufficient mechanical strength and flexibility for one or more dielectric layers to be deposited. The metallized polymer film substrate also provides mechanical support to the dielectric layer(s) during the processing steps which form the capacitor. Suitable materials the substrate layer 14 may be comprised of include, but are not limited to polyetherimide, cellulose triacetate, polyphenyl sulfone, polyester, polyimide, polyetheretherketone, or a combination thereof. In a preferred embodiment, the substrate layer 14 is comprised of cellulose triacetate.

The tensile strength of the substrate layer 14 is one measure of the flexibility and ductility of the substrate layer. It is desirable for the substrate layer 14 to have a tensile strength of greater than or equal to about 3,000 psi. In another embodiment, the substrate layer 14 has a tensile strength greater than or equal to about 5,000 psi. In another embodiment, the substrate layer 14 has a tensile strength greater than or equal to about 7,000 psi. In yet another embodiment, the substrate layer 14 has a tensile strength greater than or equal to about 9,000 psi.

The elongation of the substrate layer 14 is preferably greater than or equal to about 2 percent. In one embodiment, the elongation of the substrate layer 14 is greater than or equal to about 5 percent. In another embodiment, the elongation of the substrate layer 14 is greater than or equal to about 10 percent. In yet another embodiment, the elongation of the substrate layer 14 is greater than or equal to about 50 percent.

A first dielectric layer 16 is disposed on the first electrode layer 12. The dielectric layer 16 may be deposited on the electrode layer 12 by any method known to those having skill in the art, including but not limited to solvent casting, spin coating, dip coating, or gravure coating. The gravure coating process relies on an engraved roller running in a coating bath, which fills the engraved dots or lines of the roller with the coating material. The excess coating on the roller is wiped off by a doctor blade and the coating is then deposited onto a substrate, such as the metallized polymer carrier film described herein. The coating material may be comprised of a dielectric material that is dissolved in a proper solvent.

The electrode layer 12 may be deposited on the substrate layer 14 by thermal evaporation, physical vapor deposition or sputtering or chemical vapor deposition. If desired, a first electrode layer may 12 be deposited on a first surface 18 of the substrate layer 14, and a second electrode layer 22 may be deposited on a second opposing surface 24 of the substrate layer. The side surfaces 26 of the substrate layer 14 may also be metallized such that the substrate layer 14 is essentially disposed within a single metallization layer, as shown in FIG. 1. The metallization layer deposited on the side surfaces 26 of the substrate layer 14 is comprised of the same material the electrode layers 12 and 22 are made from. After depositing the electrode layer(s) 12 and 22 on the substrate layer 14, the first dielectric layer 16 can be deposited on the first electrode layer as described above.

Figure 2:
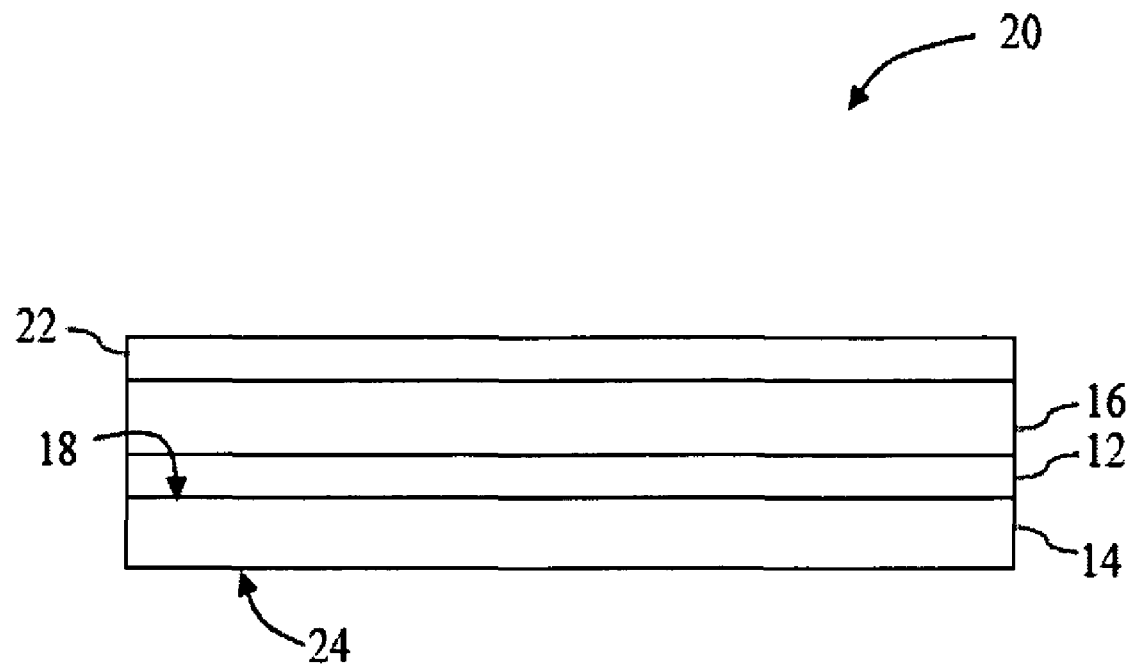
FIG. 2 is a cross-sectional view of a film capacitor in accordance with an alternative embodiment of the invention.

FIG. 2 illustrates an embodiment of a film capacitor 20 wherein a first electrode layer 12 is deposited on the first surface 18 of the substrate layer 14. The metallized polymer film comprised of the substrate layer 14 and first electrode layer 12, is used as a substrate to provide sufficient mechanical strength and flexibility for one or more dielectric layers to be deposited. The metallized polymer film substrate also provides mechanical support to the dielectric layer(s) during the processing steps which form the capacitor. A first dielectric layer 16 is then deposited on the first electrode layer 12, wherein the first electrode layer is disposed between the substrate layer 14 and the first dielectric layer. A second electrode layer 22 is deposited on the first dielectric layer 16, wherein the first dielectric layer is disposed between the first and second electrode layers 12 and 22.

Figure 3:
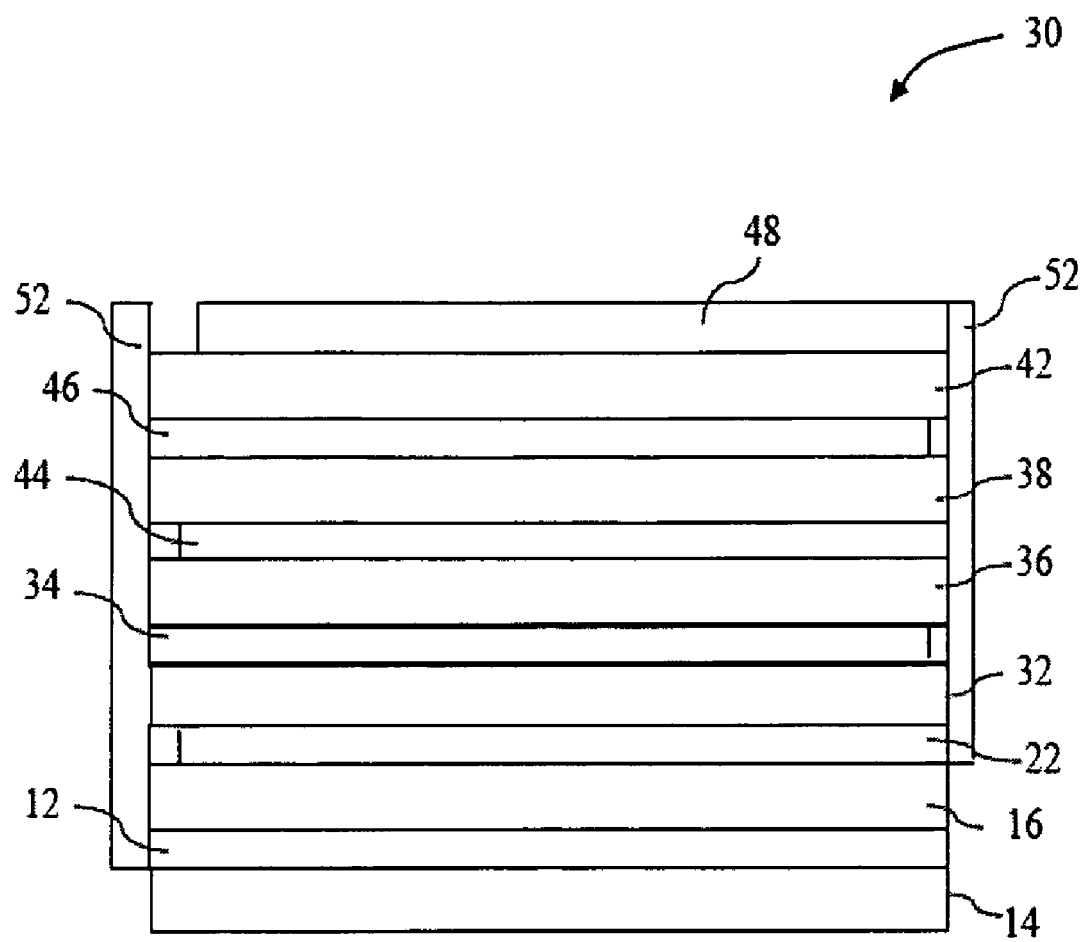
FIG. 3 is a cross-sectional view of multilayered film capacitor in accordance with an alternative embodiment of the invention.

If desired, additional electrode and dielectric layers may be added to form a multilayered capacitor film 30, as illustrated in FIG. 3. For example, a second dielectric layer 32 is deposited on the second electrode layer 22, wherein the second electrode layer is disposed between the first and second dielectric layers 16 and 32. A third electrode layer 34 is deposited on the second dielectric layer 32, whereby the second dielectric layer is disposed between the second and third electrode layers 22 and 34. Additional dielectric layers 36, 38, and 42 and electrode layers 44, 46 and 48 are formed in this alternating manner, wherein each dielectric layer is located between two electrode layers. The dielectric layers and electrode layers are deposited as described hereinabove.

A terminating metallization layer 52 should be deposited on the side surfaces of the capacitor film 30 as the lead electrode for capacitor connection purposes, as shown in FIG. 3. Suitable methods for depositing the metallization layer 52 include plasma spray techniques and the methods described herein as suitable for depositing the electrode.

The dielectric layer typically has a thickness between about 0.1 microns and about 20 microns. In one embodiment, the dielectric layer has a thickness in a range between about 5 microns and about 15 microns. In yet another embodiment of the invention, the dielectric layer has a thickness in a range between about 10 microns and about 15 microns.

The electrode layer typically has a thickness in a range between about 20 angstroms and about 300 angstroms. In one embodiment, the electrode layer has a thickness in a range between about 30 angstrom and about 150 angstroms. In yet another embodiment of the invention, the electrode layer has a thickness in a range between about 50 angstroms and about 100 angstroms.

The substrate layer 14 may have a thickness between about 0.1 microns and about 15 microns. In one embodiment, the substrate layer has a thickness in a range between about 1 micron and about 10 microns. In yet another embodiment of the invention, the substrate layer has a thickness in a range between about 3 microns and about 5 microns.

In the embodiments of the invention, the electrode layer or metallization layer may be comprised of aluminum, copper, zinc, or a combination thereof. In a preferred embodiment, the electrode layer comprises at least one of aluminum, copper or zinc foil. More preferably, the electrode layer comprises aluminum or an aluminum zinc alloy. In another preferred embodiment, the metallization layer is comprised of aluminum.

In one embodiment, the dielectric layer includes a weak and brittle polymeric material that has high permittivity and breakdown strength. As used herein, "polymeric material" refers only to the polymeric material present in the dielectric layer, unless otherwise indicated. The polymeric material and dielectric layer typically have a breakdown voltage that is at least 100 kilovolts/millimeter. In one embodiment, the polymeric material and dielectric layer have a breakdown voltage that is at least 300 kilovolts/millimeter. In another embodiment, the polymeric material and dielectric layer have a breakdown voltage that is at least 450 kilovolts/millimeter. In another embodiment, the polymeric material and dielectric layer have a breakdown voltage that is at least 600 kilovolts/millimeter.

The polymeric material may comprise polymers selected from a wide variety of thermoplastic polymers, thermosetting polymers, blends of thermoplastic polymers, blends of thermosetting polymers, or blends of thermoplastic polymers with thermosetting polymers. The polymeric material can comprise a homopolymer, a copolymer such as a star block copolymer, a graft copolymer, an alternating block copolymer or a random copolymer, ionomer, dendrimer, or a combination comprising at least one of the foregoing. The polymeric material may also be a blend of polymers, copolymers, or the like, or a combination comprising at least one of the foregoing.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylene terephthalates, polyvinylidene fluorides, polysiloxanes, polyphenylene ether, cyanoethyl cellulose, cellulose triacetate, or the like, or a combination comprising at least one of the foregoing thermoplastic polymers.

Exemplary thermoplastic polymers include polyetherimide, polyvinylidene fluoride, polyvinylidine fluoride-trifluoroethylene P(VDF-TrFE), polyvinylidene-tetrafluoroethylene copolymers P(VDF-TFE), and polyvinylidine hexafluoropropylene copolymers P(VDF-HFP), epoxy, polyester, polyimide, polyarylate, polyphenylsulfone, polystyrene, polyethersulfone, polyamideimide, polyurethane, polycarbonate, polyetheretherketone, polyphenylene ether, cyanoethyl cellulose, cyanoethyl pullulan, cellulose triacetate, or the like, or a combination comprising at least one of the foregoing.

Examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, cellulosic cyanoresin/cellulose triacetate, cyanoethyl pullulan/polyvinylidine fluoride or the like, or a combination comprising at least one of the foregoing. In a preferred embodiment, the polymeric material is a cellulosic cyanoresin.

Examples of thermosetting polymers that can be used in the polymeric material are resins of epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, thermosetting polyphenylene ether, silicone, fluorosilicone, benzimidazoles, cyanate esters, bismaleimides, reactive dicyclopentadiene resin, reactive polyamides, or the like, or a combination comprising at least one of the foregoing.

In one embodiment, suitable thermosetting polymers include thermosetting polymers that can be made from an energy activatable thermosetting pre-polymer composition. Examples include polyurethanes such as urethane polyesters, silicone polymers, phenolic polymers, amino polymers, epoxy polymers, bismaleimides, polyimides, and furan polymers. The energy activatable thermosetting pre-polymer component can comprise a polymer precursor and a curing agent. The polymer precursor can be heat activated, eliminating the need for a catalyst. The curing agent selected will not only determine the type of energy source needed to form the thermosetting polymer, but may also influence the resulting properties of the thermosetting polymer. Examples of curing agents include aliphatic amines, aromatic amines, acid anhydrides, peroxides, lewis acids or the like, or a combination comprising at least one of the foregoing. The energy activatable thermosetting pre-polymer composition may include a solvent or processing aid to lower the viscosity of the composition for ease of extrusion including higher throughputs and lower temperatures. The solvent could help retard the crosslinking reaction and could partially or totally evaporate during or after polymerization. The solvent could also act as a reactive diluent, acting as a viscosity aid before cure and reacting into the final polymer during the curing process.

It is desirable for the polymeric material to have a glass transition or softening temperature of greater than or equal to about 120 degrees Celsius. In one embodiment, it is desirable for the polymeric material to have a glass transition or softening temperature of greater than or equal to about 150 degrees Celsius. In another embodiment, it is desirable for the polymeric material to have a glass transition or softening temperature of greater than or equal to about 200 degrees Celsius. In yet another embodiment, it is desirable for the polymeric material to have a glass transition or softening temperature of greater than or equal to about 260 degrees Celsius.

In one embodiment, the polymeric material is present in an amount of about 5 to about 99.999 weight % of the total weight of the dielectric layer. In another embodiment, the polymeric material is present in an amount of about 10 weight % to about 99.99 weight % of the total weight of the dielectric layer. In another embodiment, the polymeric material is present in an amount of about 30 weight % to about 99.5 weight % of the total weight of the dielectric layer. In another embodiment, the polymeric material is present in an amount of about 50 weight % to about 99.3 weight % of the total weight of the dielectric layer.

In one embodiment, the elongation of the polymeric material is less than or equal to about 2 percent. In one embodiment, the elongation of the polymeric material is less than or equal to about 5 percent. In another embodiment, the elongation of the polymeric material is less than or equal to about 10 percent. In another embodiment, the elongation of the polymeric material is less than or equal to about 50 percent. In yet another embodiment, the elongation of the polymeric material is less than or equal to about 100 percent.

The polymeric material together with any optionally desired organic fillers may generally be combined in several different ways such as, but not limited to compounding, melt blending, solution blending, or the like, or a combination comprising at least one of the foregoing methods. Melt blending of these components involves the use of shear force, extensional force, compressive force, ultrasonic energy, electromagnetic energy, thermal energy or a combination comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or a combination comprising at least one of the foregoing.

The polymeric material and any optional organic fillers may be subject to multiple blending and forming steps if desirable to form the dielectric layer. For example, the polymeric material and optional fillers may first be extruded and formed into pellets. The pellets may then be fed into a molding machine where it may be formed into other desirable shapes. Alternatively, the composition emanating from a single melt blender may be formed into sheets or strands and subjected to post-extrusion processes such as annealing, uniaxial or biaxial orientation.

If the polymeric material and fillers are solution blended, the composition formed therefrom can be cast, spin cast, dip coated, spray painted, brush painted and/or electrostatically spray painted onto a desired substrate, such as an electrode layer. The solution is then dried leaving behind the dielectric layer on the substrate surface. In another embodiment, the solution comprising the desired composition may be spun, compression molded, injection molded or blow molded to form a dielectric layer. Blending can be assisted using various secondary species such as dispersants, binders, modifiers, detergents, and additives.

In one embodiment, the dielectric layer has a corona resistance that is resistant to a current of about 1000 volts to 5000 volts applied for about 200 hours to about 2000 hours. In another embodiment, the dielectric layer has a corona resistance that is resistant to a current of about 1000 volts to 5000 volts applied for about 250 hours to about 1000 hours. In yet another embodiment, the dielectric layer has a corona resistance that is resistant to a current of about 1000 volts to 5000 volts applied for about 500 hours to about 900 hours.

The dielectric layer has a dielectric constant greater than or equal to about 3 when measured at frequencies of about 1 to about $10^6$ hertz (Hz). In one embodiment, the dielectric layer has a dielectric constant greater than or equal to about 5 when measured at frequencies of about 1 to about $10^6$ hertz (Hz). In another embodiment, the dielectric layer has a dielectric constant greater than or equal to about 10 when measured at frequencies of about 1 to about $10^6$ hertz (Hz). In another embodiment, the dielectric layer has a dielectric constant greater than or equal to about 20 when measured at frequencies of about 1 to about $10^6$ hertz (Hz). In yet another embodiment, the dielectric layer has a dielectric constant greater than or equal to about 50 when measured at frequencies of about 1 to about $10^6$ hertz (Hz).

It is desirable for the dielectric layer to have a glass transition or softening point temperature of greater than or equal to about 100 degrees Celsius. In one embodiment, the dielectric layer has a glass transition or softening point temperature of greater than or equal to about 120 degrees Celsius. In another embodiment, the dielectric layer has a glass transition or softening point temperature of greater than or equal to about 150 degrees Celsius. In another embodiment, the dielectric layer has a glass transition or softening point temperature of greater than or equal to about 180 degrees Celsius. In yet another embodiment, the dielectric layer has a glass transition or softening point temperature of greater than or equal to about 200 degrees Celsius.

Furthermore, the dielectric layer may have a loss factor below 0.02. In a preferred embodiment, the dielectric layer has a loss factor below 0.005.

The capacitors described herein are useful for a broad range of applications such as power conversion, power conditioning and pulsed power applications. The film capacitors are particularly useful in high temperature environments. The capacitors described herein typically have an operating temperature in a range between about −40 degrees Celsius and about 200 degrees Celsius. In another embodiment, the capacitor has an operating temperature in a range between about 0 degree Celsius and about 150 degrees Celsius. In yet another embodiment of the invention, the capacitor has an operating temperature in a range between about 20 degrees Celsius and about 120 degrees Celsius.

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A capacitor comprising:
    a substrate layer;
    a first electrode layer disposed on the substrate layer, wherein the substrate layer and the first electrode layer form a metallized polymer film; and
    a first dielectric layer disposed on the electrode layer, wherein the dielectric layer comprises:
        a polymeric material having an elongation less than or equal to about 5 percent.

2. The capacitor of claim 1, wherein the electrode layer comprises aluminum, copper, zinc, or a combination thereof.

3. The capacitor of claim 1, wherein the polymeric material comprises a thermoplastic polymer or a thermosetting polymer.

4. The capacitor of claim 3, wherein the polymeric material comprises a cellulosic cyanoresin.

5. The capacitor of claim 1, wherein the substrate layer comprises polyetherimide, cellulose triacetate, polyphenyl sulfone, polyester, polyimide, polyetheretherketone, or a combination thereof.

6. The capacitor of claim 5, wherein the substrate layer comprises cellulose triacetate.

7. The capacitor of claim 6, wherein the substrate layer is in the form of a film.

8. The capacitor of claim 1, wherein the polymeric material has an elongation less than or equal to about 2 percent.

9. The capacitor of claim 1, wherein the polymeric material has a breakdown voltage of at least 100 kilovolts/millimeter.

10. The capacitor of claim 1, wherein the dielectric layer has a dielectric constant of greater than or equal to about 3.

11. The capacitor of claim 1, wherein the substrate layer has a tensile strength of greater than or equal to about 300 psi.

12. The capacitor of claim 1, wherein the substrate layer has an elongation of greater than or equal to about 2 percent.

13. The capacitor of claim 1, wherein the substrate layer has a thickness in a range between about 0.1 microns and about 15 microns.

14. The capacitor of claim 1, wherein the first dielectric layer has a thickness in a range between about 0.1 microns and about 20 microns.

15. The capacitor of claim 1, wherein the first electrode layer has a thickness in a range between about 20 angstroms and about 300 angstroms.

16. The capacitor of claim 1, wherein the first dielectric layer has a loss factor below 0.02.

17. The capacitor of claim 1, wherein the capacitor has an operating temperature in a range between about −40 degrees Celsius and about 200 degrees Celsius.

18. The capacitor of claim 1, further comprising:
    a second electrode layer, wherein the first dielectric layer is disposed between the first electrode layer and the second electrode layer.

19. The capacitor of claim 18, further comprising:
    a second dielectric layer; and
    a third electrode layer, wherein the second dielectric layer is disposed between the second electrode layer and the third electrode layer.

20. The capacitor of claim 19, wherein the capacitor further comprises:
    a top surface,
    a bottom surface, wherein the substrate layer is disposed proximate the bottom surface;
    at least two side surfaces; and
    a terminating metallization layer disposed on at least a portion of the side surfaces.

21. The capacitor of claim 20, wherein the metallization layer comprises aluminum, copper, zinc, or a combination thereof.

22. The capacitor of claim 1, wherein the substrate layer comprises a first surface and a second surface, wherein the first electrode layer is disposed on the first surface of the substrate layer, and wherein the capacitor further comprises:
    a second electrode layer disposed on the second surface of the substrate layer.

23. The capacitor of claim 22, wherein the substrate layer comprises at least two side surfaces adjacent the first surface and second surface, and wherein the capacitor further comprises:
    a metallization layer disposed on at least a portion of the side surfaces.

24. A capacitor comprising:
    a substrate layer comprising cellulose triacetate, wherein the substrate layer has a tensile strength of greater than or equal to about 300 psi;
    a first electrode layer disposed on the substrate layer, wherein the substrate layer and the first electrode layer form a metallized polymer film; and
    a first dielectric layer disposed on the electrode layer, wherein the dielectric layer comprises:
        a polymeric material having an elongation less than or equal to about 5 percent.

* * * * *